(12) United States Patent
Wang et al.

(10) Patent No.: US 8,453,836 B1
(45) Date of Patent: Jun. 4, 2013

(54) MOBILE DEVICE PROTECTIVE CASE WITH SLIDABLE SHUTTER

(75) Inventors: Han-Yuan Wang, Taipei (TW);
Chih-Ming Chang, New Taipei (TW);
David John Ardener, Essex (GB);
Mao-Shen Wang, New Taipei (TW)

(73) Assignee: Topkase International Co., Ltd., New Taipei (TW)

( * ) Notice: Subject to any disclaimer, the term of this patent is extended or adjusted under 35 U.S.C. 154(b) by 0 days.

(21) Appl. No.: 13/295,156

(22) Filed: Nov. 14, 2011

(51) Int. Cl.
*B65D 85/00* (2006.01)
*B65D 43/12* (2006.01)
*B65D 43/20* (2006.01)

(52) U.S. Cl.
USPC .................. 206/320; 220/345.3; 220/350

(58) Field of Classification Search
USPC ............... 206/305, 320; 220/345.1–345.6; 361/679.01–679.07
See application file for complete search history.

(56) References Cited

U.S. PATENT DOCUMENTS

| | | | | |
|---|---|---|---|---|
| 1,989,590 A | * | 1/1935 | Florman | 220/350 |
| 2,000,162 A | * | 5/1935 | Buscham | 220/350 |
| 4,854,632 A | * | 8/1989 | Kreuze et al. | 296/37.8 |
| 4,941,570 A | * | 7/1990 | Kruger et al. | 220/350 |
| 5,295,605 A | * | 3/1994 | Kawahito et al. | 220/350 |
| 7,654,406 B2 | * | 2/2010 | Yanagisawa et al. | 220/345.3 |

* cited by examiner

*Primary Examiner* — Bryon Gehman
(74) *Attorney, Agent, or Firm* — Bacon & Thomas, PLLC (57) ABSTRACT

A mobile device protective case (10) includes a frame (20) and a slidable shutter (30) mounted on the frame (20) to function as a slidable component. After a mobile device (50) has been inserted into the frame (20), the slidable shutter (30) hides a touch panel (51) of the mobile device (50) to prevent the touch panel (51) from being scratched or scraped. To start using the mobile device (50), a user moves the slidable shutter (30), such that the touch panel (51) of the mobile device (50) is exposed and can be directly operated by the user.

14 Claims, 8 Drawing Sheets

MOBILE DEVICE PROTECTIVE CASE WITH SLIDABLE SHUTTER

BACKGROUND OF THE INVENTION

1. Field of the Invention

The present invention relates to a mobile device protective case, and more particularly, to a mobile device protective case with a slidable shutter.

2. Description of the Related Art

Touch panels have been well developed to provide a keying function. Hence, almost every existing portable electronic product (hereinafter referred to as a mobile device), such as a mobile phone, a personal digital assistant (PDA) or a tablet computer, is a light and thin electronic product equipped with a touch panel. As a result, a key which used to be an integral part of a portable electronic product is no longer found thereon.

BRIEF SUMMARY OF THE INVENTION

In view of this, it is a primary objective of the present invention to provide a mobile device protective case with a slidable shutter. The mobile device protective case comprises a frame and a slidable shutter. The slidable shutter is mounted on the frame to function as a slidable component. After a mobile device has been inserted into the frame, the slidable shutter hides a touch panel of the mobile device to prevent the touch panel of the mobile device from being scratched or scraped. To start operating the touch panel of the mobile device, a user opens the slidable shutter to unveil the touch panel of the mobile device.

The frame, which is a unitary structure, comprises two U-shaped blocks and a first connection panel. The first connection panel has more length than width. The two lengthwise ends of the first connection panel are connected to the two U-shaped blocks, respectively, in a manner that the two U-shaped blocks are spaced apart from each other to form a window-shaped chamber E3, and an insertion chamber E1 is formed beneath the first connection panel.

The U-shaped blocks each have an accommodation chamber E2 in communication with the insertion chamber E1 and the window-shaped chamber E3 to form an assembly space for receiving a mobile device therein, and a U-shaped groove is disposed on each of the two face-to-face sides of the two spaced-apart U-shaped blocks.

The slidable shutter comprises a plurality of shutter-shaped elements hinged together. The two face-to-face U-shaped grooves respectively hold one end of each shutter-shaped elements and thereby enables the slidable shutter to slide in order to open or shut the window-shaped chamber E3 of the frame.

The mobile device protective case of the present invention further comprises an auxiliary housing element. The auxiliary housing element comprises a hollowed-out chamber corresponding in position to the window-shaped chamber E3 of the frame. The auxiliary housing element comes in different colors or decorative patterns for the user to choose from. The user encases the frame of the mobile device protective case of the present invention tightly in the auxiliary housing element to change the surface decoration of the frame.

Regarding the mobile device protective case of the present invention, a stop block capable of positioning is disposed at each of the U-shaped blocks of the frame and located on the outer side of each of the accommodation chambers E2.

Regarding the mobile device protective case of the present invention, a wiper is disposed on the back of the shutter-shaped element(s) of the slidable shutter and adapted to wipe the touch panel of the mobile device.

Regarding the mobile device protective case of the present invention, a thin flat surface having a thickness ranging between 0.08 mm and 0.8 mm is formed on the slidable shutter, which thin flat surface is designed to operate a function of "slide to unlock" of a mobile device, if a user's finger contacted with the thin flat surface and moved the slidable shutter being in sliding displacement.

Regarding the mobile device protective case of the present invention, for replacement of a slidable shutter by "Do It Yourself", each U-shaped block of the frame further comprises a slot formed on the bottom of the upper panel thereof and constructed to communicate with ones own corresponding U-shaped grooves of the frame respectively.

Regarding the mobile device protective case of the present invention, for preventing a mobile device after assembled escaped from the mobile device protective case of the invention, each U-shaped block of the frame further comprises plural sucking parts dispersedly or orderly mounted on the accommodation chamber (E2) to suck the mobile device securely.

DETAILED DESCRIPTION OF THE INVENTION

Figure 1:
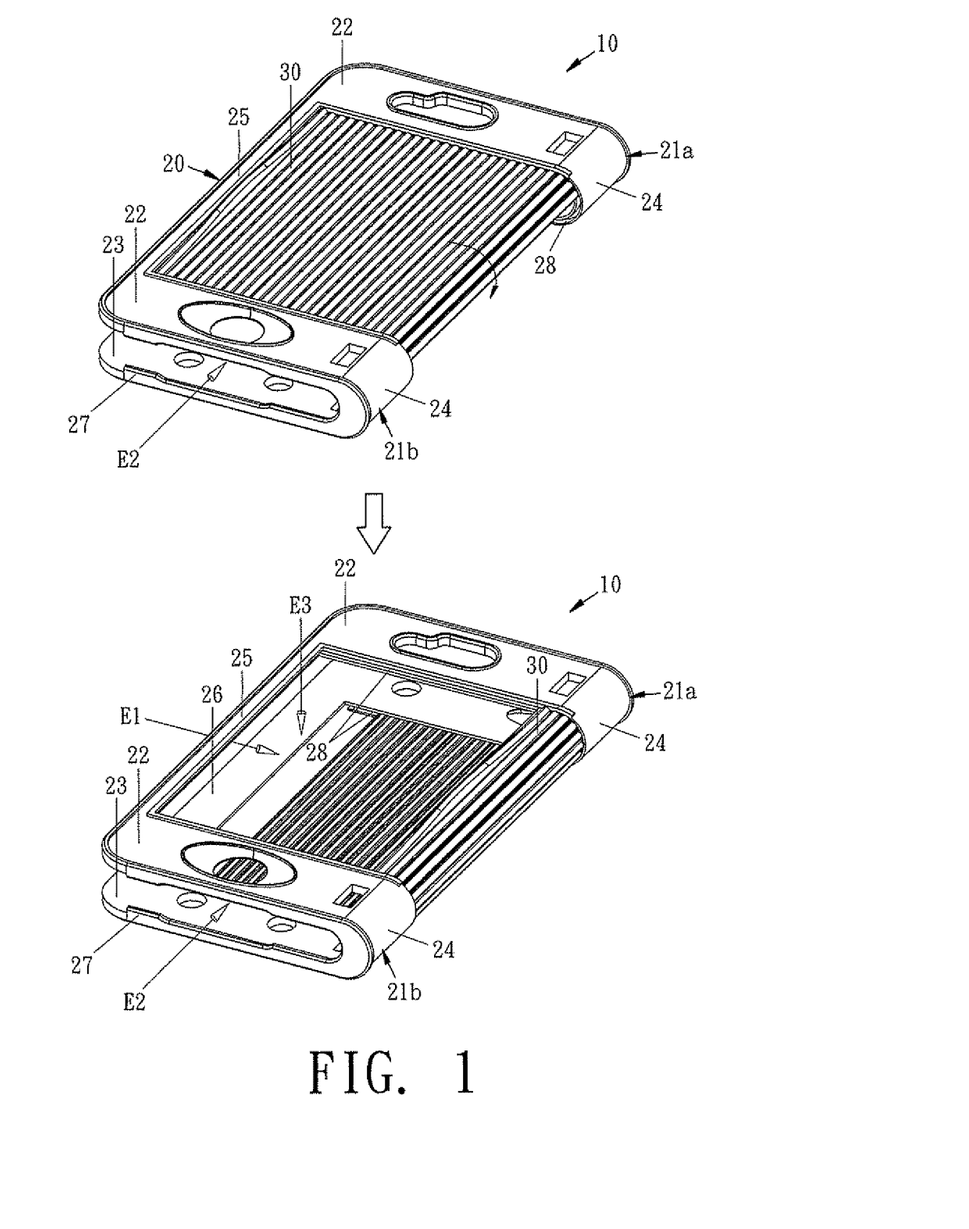
FIG. 1 is a schematic view of a mobile device protective case of the present invention.
Figure 2:
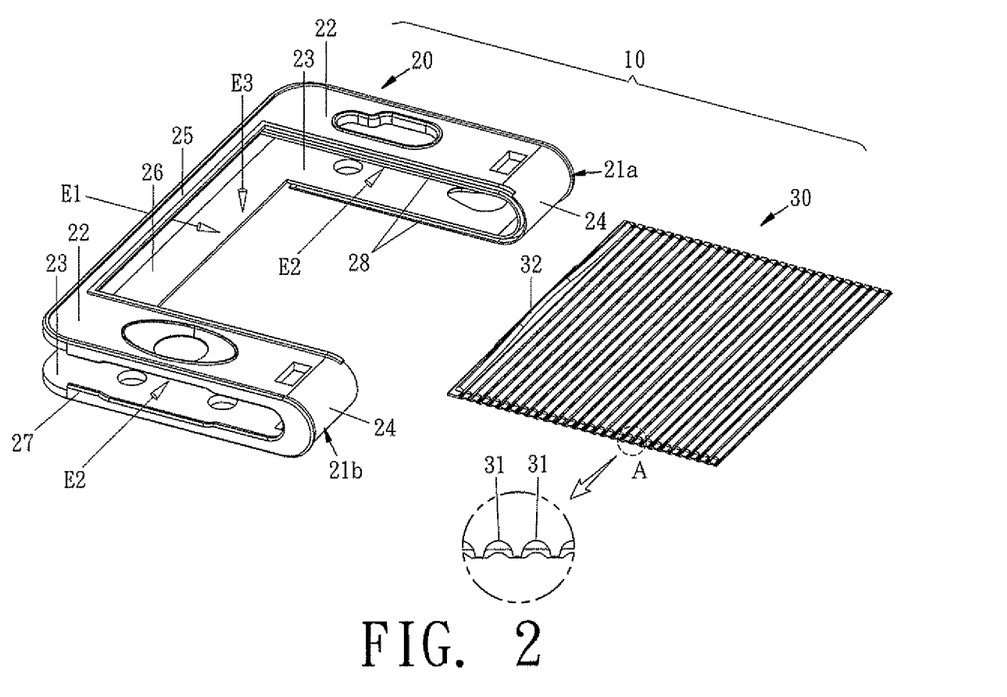
FIG. 2 contains an exploded view of the mobile device protective case and a partial enlarged view of a slidable shutter shown at position A according to the present invention.
Figure 3:
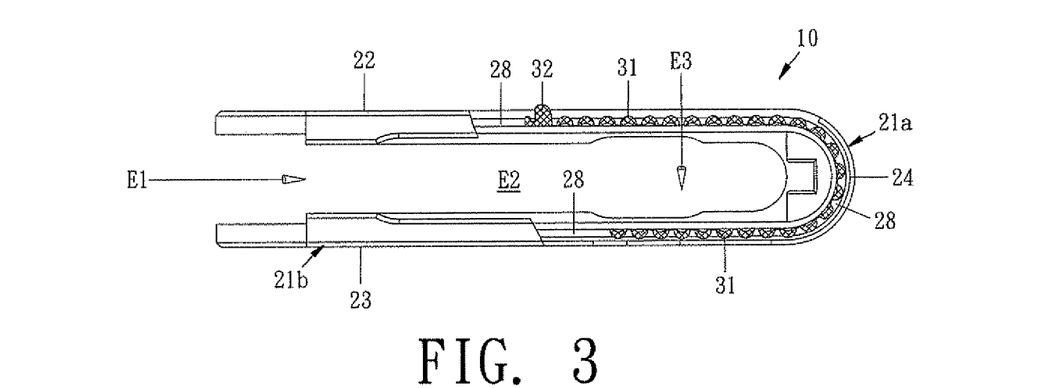
FIG. 3 is a partial cross-sectional enlarged view of the mobile device protective case of the present invention.

Referring to FIG. 1 through FIG. 3, a mobile device protective case 10 of the present invention comprises a frame 20 and a slidable shutter 30. The slidable shutter 30 is mounted on the frame 20 to function as a slidable component of the frame 20.

The frame 20, which is a unitary structure, comprises two U-shaped blocks 21a and 21b and a first connection panel 25, wherein the first connection panel 25 that separates and spaces the two U-shaped blocks 21a and 21b by a distance.

The two U-shaped blocks 21a and 21b each comprise an upper panel 22, a lower panel 23, and a bent panel 24. The bent panel 24 has one end connected to the upper panel 22 and the other end connected to the lower panel 23 so as to separate the upper panel 22 and the lower panel 23 by a distance. Hence, the two U-shaped blocks 21a and 21b each have an accommodation chamber E2 defined by the upper panel 22, the lower panel 23, and the bent panel 24.

Referring to FIG. 2 and FIG. 3, the first connection panel 25 has more length than width. The two lengthwise ends of the first connection panel 25 are connected to the upper panels 22 of the two spaced-apart U-shaped blocks 21a and 21b, respectively. Hence, an insertion chamber E1 is formed beneath the first connection panel 25 of the frame 20. The insertion chamber E1 is in communication with the accommodation chambers E2 of the two U-shaped blocks 21a and 21b. A window-shaped chamber E3 is defined between the two spaced-apart U-shaped blocks 21a and 21b of the frame 20. The window-shaped chamber E3 is in communication with the insertion chamber E1 and the accommodation chambers E2.

Referring to FIG. 2, in another specific embodiment, the frame 20 either comprises a second connection panel 26 instead of the first connection panel 25 or further comprises a second connection panel 26 disposed beneath the first connection panel 25, wherein the second connection panel 26 connects the lower panels 23 of the two spaced-apart U-shaped blocks 21a and 21b, such that the frame 20 also has the insertion chamber E1, the two accommodation chambers E2, and the window-shaped chamber E3.

Referring to FIG. 2, the slidable shutter 30 made of flexible material comprises a plurality of shutter-shaped elements 31 formed by molding techniques as a unitary structure. To mount the slidable shutter 30 on the frame 20, a U-shaped groove 28 is disposed on each of the two face-to-face sides of the two spaced-apart U-shaped blocks 21a and 21b. Each U-shaped grooves 28 not only respectively hold one end of each of the shutter-shaped elements 31 of the slidable shutter 30, but also enables the mounted slidable shutter 30 to function as a slidable component capable of sliding along the U-shaped grooves 28.

Figure 9:
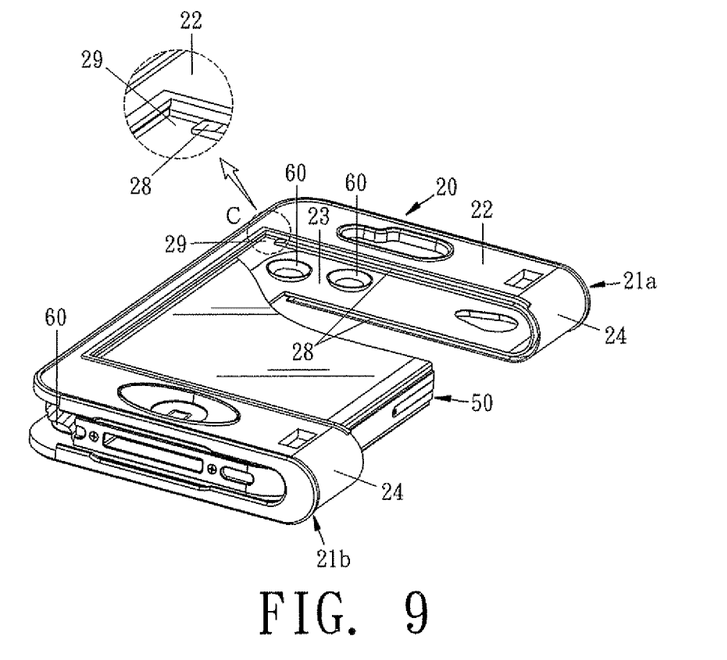
FIG. 9 is a schematic view of the mobile device protective case provided with plural sucking parts for preventing a mobile device escaped from the mobile device protective case and a partial enlarged view of the slidable shutter shown at position C according to the present invention.
Figure 10:
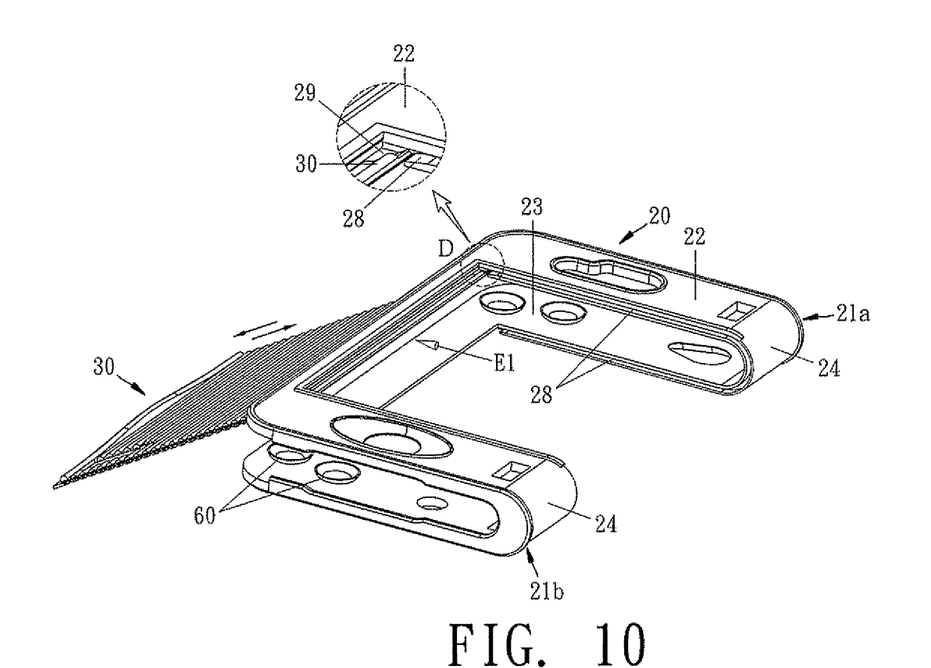
FIG. 10 is a schematic view of the mobile device protective case provided with slots designed for replacement of the slidable shutter by a user who can do it himself/herself and a partial enlarged view of the slidable shutter shown at position D according to the present invention.

Referring to FIG. 9 and FIG. 10, in another specific embodiment, each U-shaped block 21a or 21b of the frame 20 further comprises a slot 29 formed on the bottom of the upper panel 22 thereof and constructed to communicate with ones own corresponding U-shaped grooves 28 of the frame 20 respectively.

The slots 29 are designed for replacement of the slidable shutter 30 by a user who can do it himself/herself (or called DIY). Therefore, a used slidable shutter 30 of the mobile device protective case 10 of the present invention if a user has a dislike for the slidable shutter 30 is capable of being detached from the frame 20 through the slots 29 by DIY of the user, and vice versa, through the slots 29 a favorite or novel slidable shutter 30 is also capable of being quickly mounted to the frame 20 by the user for variant of the user's mobile device protective case 10.

Referring to FIG. 1 and FIG. 3, given the aforesaid control mechanism for displacement of the slidable shutter 30, the window-shaped chamber E3 of the frame 20 can be opened or shut by the slidable shutter 30. As shown in FIG. 2, to make it easy to manipulate the sliding of the slidable shutter 30, a raised handle 32 is disposed one of the shutter-shaped elements 31 located at the front of the slidable shutter 30.

Figure 4:
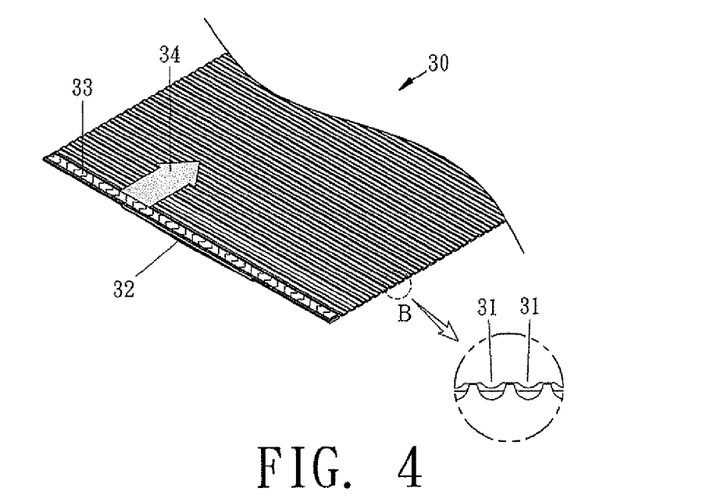
FIG. 4 is a schematic view of a wiper disposed on the back of the slidable shutter or a thin flat surface formed on the slidable shutter of the mobile device protective case and a partial enlarged view of the slidable shutter shown at position B according to the present invention.

Referring to FIG. 4, to enable the slidable shutter 30 to scrub, a wiper 33 is disposed on the back of the shutter-shaped element 31 having the raised handle 32.

Figure 5:
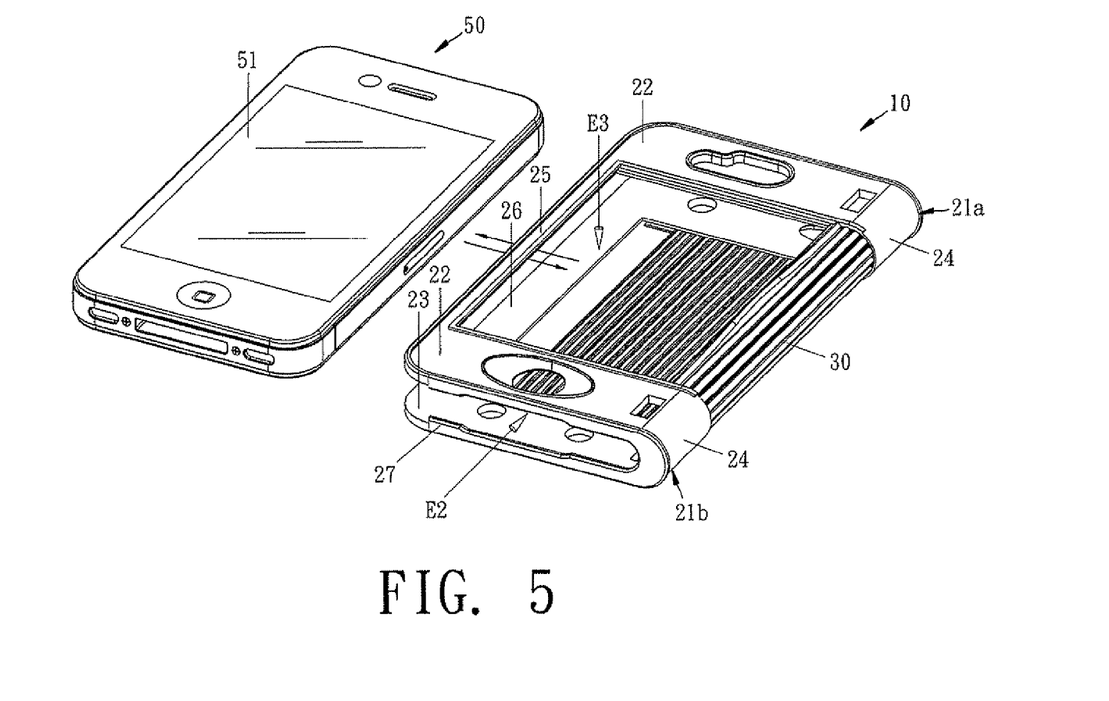
FIG. 5 is a schematic view of the mobile device protective case for use with a mobile device according to the present invention.
Figure 6:
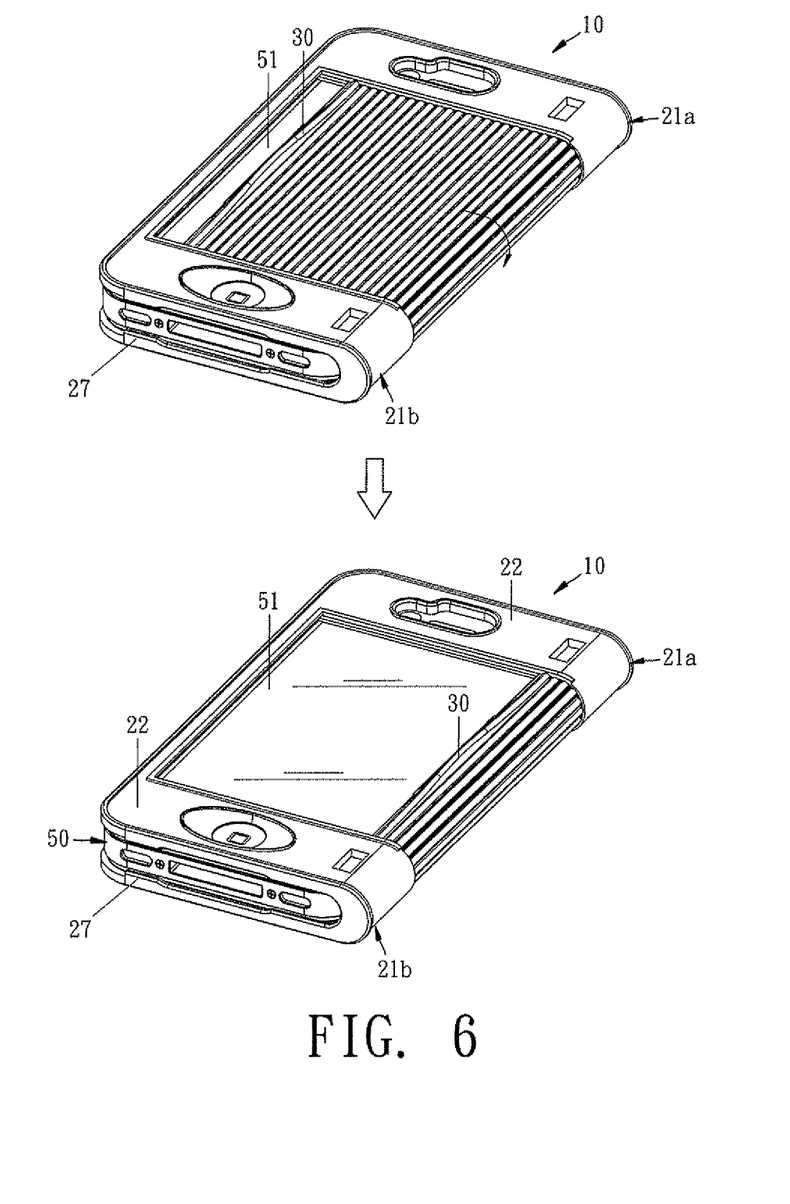
FIG. 6 is a schematic view of the mobile device protective case for use with a mobile device, showing that the slidable shutter is pulled open to expose a touch panel of the mobile device according to the present invention.

Referring to FIG. 5 and FIG. 6, the mobile device protective case 10 of the present invention serves the purpose of preventing the touch panel 51 of the mobile device 50 from being scratched or scraped. When in use, the insertion chamber E1, the accommodation chambers E2, and the window-shaped chamber E3 of the mobile device protective case 10 of the present invention together form an assembly space. After the mobile device 50 has been inserted into the insertion chamber E1 of the mobile device protective case 10 of the present invention, the mobile device 50 is in its entirety confined to the mobile device protective case 10 of the present invention.

At this point in time, the touch panel 51 of the mobile device 50 is placed under the protection of the slidable shutter 30 of the mobile device protective case 10 of the present invention such that, even if the mobile device protective case 10 of the present invention is hit, the slidable shutter 30 can still prevent the touch panel 51 of the mobile device 50 from being scratched or scraped.

Referring to FIG. 6, to start using the mobile device 50, a user moves the slidable shutter 30 of the mobile device protective case 10 of the present invention, such that the touch panel 51 of the mobile device 50 is exposed and can be directly operated by the user. Furthermore, the wiper 33 disposed on the back of the slidable shutter 30 wipes the touch panel 51 of the mobile device 50 in the course of the movement of the slidable shutter 30.

Figure 11:
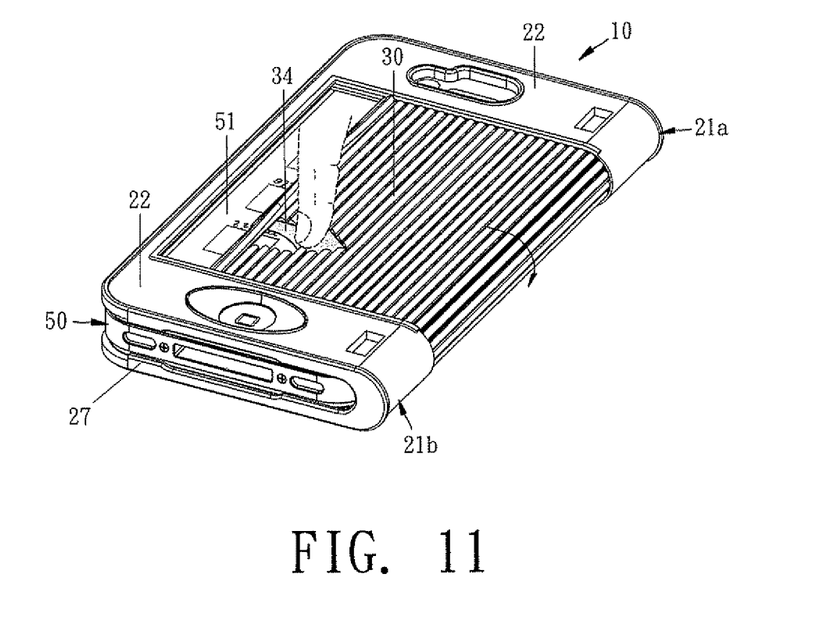
FIG. 11 is a schematic view of the slidable shutter provided with a thin flat surface designed to operate the function of "slide to unlock" of the mobile device, if a user moves the slidable shutter being in sliding displacement through the user's finger contacted with the thin flat surface.

Referring to FIG. 4 and FIG. 11, in another specific embodiment, the slidable shutter 30 further comprises a thin flat surface 34 formed thereon having a thickness ranging between 0.08 mm and 0.8 mm, preferably 0.5 mm of thickness.

The thin flat surface 34 is capably formed with an entire surface defining a grille-shaped or grid-shaped surface, which is designed to operate the function of "slide to unlock" of the mobile device 50. As shown in FIG. 11 when a user's finger comes in contact with the thin flat surface 34 of the slidable shutter 30 of the mobile device protective case 10 and moves the slidable shutter 30 being in sliding displacement, due to electricity inducted through the thin flat surface 34, the touch panel 51 of the mobile device 50 seems to be directly touched by the user's finger and then synchronously performs the function of "slide to unlock" and simultaneously displays information to the user.

Referring to FIG. 2 and FIG. 5, a stop block 27 is disposed at each of the two U-shaped blocks 21a and 21b of the frame 20 of the mobile device protective case 10 of the present invention, and the stop block 27 is located on the outer side of each of the accommodation chambers E2 of the two U-shaped blocks 21a and 21b. Hence, once the mobile device 50 is inserted into the mobile device protective case 10 of the present invention, the mobile device 50 will be guided to its position and cannot escape from the accommodation chambers E2.

Figure 7:
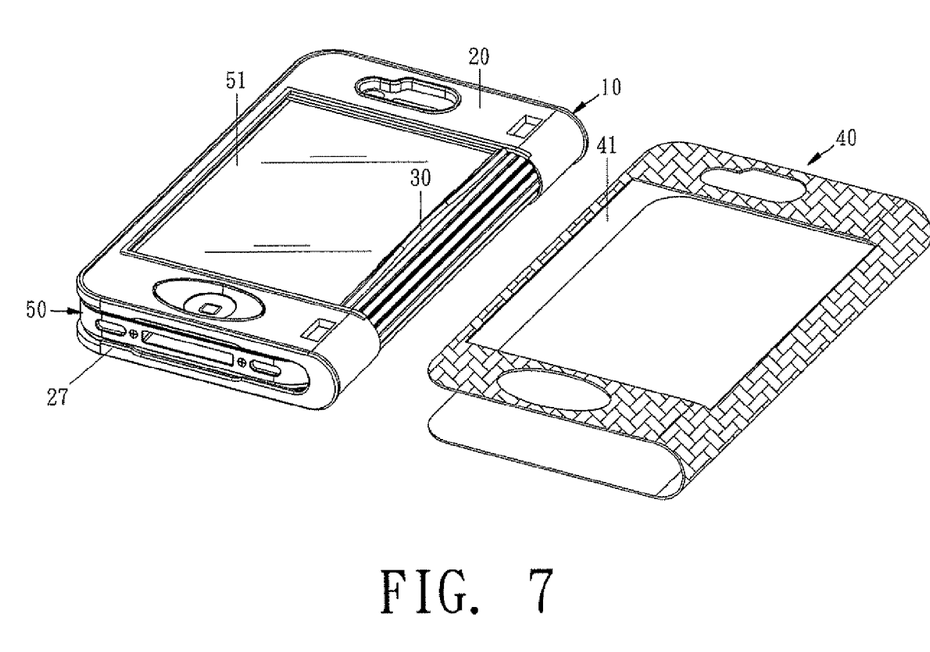
FIG. 7 is a schematic view of the mobile device protective case and an auxiliary housing element for providing close-fitting covering to the mobile device protective case and changing surface decoration thereof according to the present invention.
Figure 8:
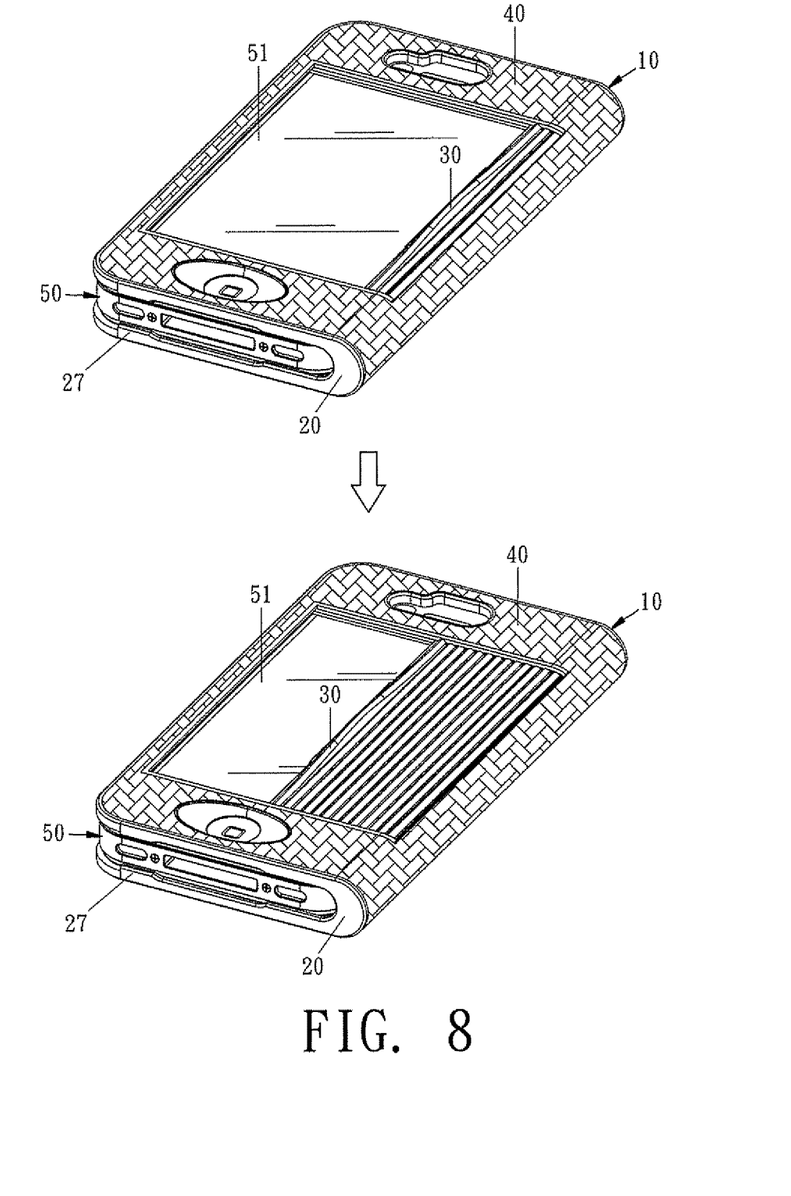
FIG. 8 is a schematic view of the mobile device protective case encased in the auxiliary housing element of FIG. 7, showing that the slidable shutter is still capable of being pulled open or shut according to the present invention.

Referring to FIG. 7 and FIG. 8, in another specific embodiment, the mobile device protective case 10 of the present invention further comprises an auxiliary housing element 40 that comes in different colors or decorative patterns for the user to choose from according to user preference. The user encases the frame 20 of the mobile device protective case 10 of the present invention tightly in the auxiliary housing element 40 by means of a snap fastener or Velcro to change the surface decoration of the frame 20.

The shape of the auxiliary housing element 40 matches the shape of the frame 20 of the mobile device protective case 10 of the present invention. The auxiliary housing element 40 comprises a hollowed-out chamber 41 corresponding in position to the window-shaped chamber E3 of the frame 20. As shown in FIG. 8, after the frame 20 of the mobile device protective case 10 of the present invention has been encased in the auxiliary housing element 40 in a close-fitting manner, the slidable shutter 30 mounted on the frame 20 is still slidable. Hence, the user can operate the touch panel 51 of the mobile device 50 freely.

Referring to FIG. 9 and FIG. 10, in another specific embodiment, each U-shaped block 21a or 21b of the frame 20 of the mobile device protective case 10 of the present invention further provides with plural sucking parts 60 dispersedly or orderly mounted on the accommodation chamber E2 thereof. After a mobile device 50 has been assembled into the accommodation chamber E2 of the mobile device protective case 10 of the present invention, the mobile device 50 is capable of being sucked with those sucking parts 60 to prevent the mobile device 50 escaped from the mobile device protective case 10 of the invention.

What is claimed is:

1. A mobile device protective case comprising a frame (20) and a slidable shutter (30) mounted on the frame (20) to function as a slidable component, characterized in that:
   the frame (20) constructed as a unitary structure comprises two U-shaped blocks (21a and 21b), a first connection panel (25) and an insertion chamber (E1) beneath the first connection panel (25), wherein
      the first connection panel (25) has two lengthwise ends connected to said two U-shaped blocks (21a and 21b) respectively and spaces said two U-shaped blocks (21a and 21b) apart from each other to form a window-shaped chamber (E3);
      the U-shaped blocks (21a and 21b) each have an accommodation chamber (E2) in communication with the insertion chamber (E1) and the window-shaped chamber (E3) to form an assembly space for receiving a mobile device (50) therein, and a U-shaped groove (28) is disposed on each of the two face-to-face sides of said two U-shaped blocks (21a and 21b); and
   the slidable shutter (30) made of flexible material comprises a plurality of shutter shaped elements (31) formed as a unitary structure, wherein each shutter shaped element (31) has two ends slidably mounted into each corresponding U-shaped grooves (28) of the frame (20) respectively to enable the slidable shutter (30) by sliding to open or shut the window-shaped chamber (E3) of the frame (20).

2. The mobile device protective case of claim 1, further comprising an auxiliary housing element (40) for encasing the frame (20) in a close-fitting manner, and the auxiliary housing element (40) comprising a hollowed-out chamber (41) corresponding in position to the window-shaped chamber (E3) of the frame (20).

3. The mobile device protective case of claim 2, wherein a stop block (27) is disposed at each of the U-shaped blocks (21a and 21b) of the frame (20) and located on an outer side of each of the accommodation chambers (E2).

4. The mobile device protective case of claim 2, wherein a wiper (33) is disposed on a back of the shutter-shaped elements (31) of the slidable shutter (30).

5. The mobile device protective case of claim 2, wherein a thin flat surface (34) having a thickness ranging between 0.08 mm and 0.8 mm is defines a grille-shaped surface on the slidable shutter (30).

6. The mobile device protective case of claim 2, wherein a thin flat surface (34) having a thickness of 0.5 mm is formed on the slidable shutter (30).

7. The mobile device protective case of claim 2, wherein each U-shaped block (21a or 21b) of the frame (20) further comprises an upper panel (22) and a slot (29) formed on the bottom of the upper panel (22) thereof and constructed to communicate with ones own corresponding U-shaped grooves (28) of the frame (20) respectively.

8. The mobile device protective case of claim 2, wherein each U-shaped block (21a or 21b) of the frame (20) further comprises plural sucking parts (60) dispersedly or orderly mounted on the accommodation chamber (E2) thereof.

9. The mobile device protective case of claim 1, wherein a stop block (27) is disposed at each of the U-shaped blocks (21a and 21b) of the frame (20) and located on an outer side of each of the accommodation chambers (E2).

10. The mobile device protective case of claim 1, wherein a wiper (33) is disposed on a back of the shutter shutter-shaped elements (31) of the slidable shutter (30).

11. The mobile device protective case of claim 1, wherein a thin flat surface (34) having a thickness ranging between 0.08 mm and 0.8 mm is defines a grille-shaped surface on the slidable shutter (30).

12. The mobile device protective case of claim 1, wherein a thin flat surface (34) having a thickness of 0.5 mm is formed on the slidable shutter (30).

13. The mobile device protective case of claim 1, wherein each U-shaped block (21a or 21b) of the frame 20 further comprises an upper panel and a slot (29) formed on the bottom of the upper panel (22) thereof and constructed to communicate with ones own corresponding U-shaped grooves (28) of the frame (20) respectively.

14. The mobile device protective case of claim 1, wherein each U-shaped block (21a or 21b) of the frame (20) further comprises plural sucking parts (60) dispersedly or orderly mounted on the accommodation chamber (E2) thereof.

* * * * *